United States Patent
Park et al.

(10) Patent No.: US 11,163,193 B2
(45) Date of Patent: Nov. 2, 2021

(54) BACKLIGHT UNIT WITH REFLECTION FILTERS AND DISPLAY DEVICE COMPRISING THE SAME

(71) Applicant: LG Display Co., Ltd., Seoul (KR)

(72) Inventors: GwanHoon Park, Paju-si (KR); SuHun Lee, Paju-si (KR); SangChul Ryu, Paju-si (KR); DongSeok Lee, Paju-si (KR); MyungJoon Park, Paju-si (KR); KyuHwan Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/999,955

(22) Filed: Aug. 21, 2020

(65) Prior Publication Data

US 2021/0116754 A1   Apr. 22, 2021

(30) Foreign Application Priority Data

Oct. 17, 2019 (KR) .......................... 10-2019-0128958

(51) Int. Cl.

| | |
|---|---|
| *G02F 1/13357* | (2006.01) |
| *F21V 9/30* | (2018.01) |
| *F21V 9/32* | (2018.01) |
| *F21V 9/20* | (2018.01) |
| *F21V 9/35* | (2018.01) |
| *F21V 8/00* | (2006.01) |
| *G02F 1/1335* | (2006.01) |

(52) U.S. Cl.
CPC .......... *G02F 1/133605* (2013.01); *F21V 9/20* (2018.02); *F21V 9/30* (2018.02); *F21V 9/32* (2018.02); *F21V 9/35* (2018.02); *G02B 6/0026* (2013.01); *G02F 1/133606* (2013.01); *G02B 6/005* (2013.01); *G02B 6/0055* (2013.01); *G02F 1/133603* (2013.01); *G02F 1/133614* (2021.01)

(58) Field of Classification Search
CPC ..... F21V 9/20; F21V 9/30; F21V 9/32; F21V 9/35; G02B 6/26; G02F 1/133605; G02F 1/133606; G02F 1/133607; G02F 1/133609; G02F 1/133611
See application file for complete search history.

(56) References Cited

U.S. PATENT DOCUMENTS

| | | | | |
|---|---|---|---|---|
| 10,158,048 B2 * | 12/2018 | Kim | ................... | H01L 33/465 |
| 2019/0187517 A1 * | 6/2019 | Kwak | ................. | G02B 5/287 |
| 2020/0159078 A1 * | 5/2020 | Watanabe | ......... | G02F 1/133606 |
| 2020/0285112 A1 * | 9/2020 | Miyata | .............. | G02F 1/133617 |
| 2021/0026202 A1 * | 1/2021 | Nam | ................. | G02F 1/133605 |

* cited by examiner

*Primary Examiner* — Keith G. Delahoussaye
(74) *Attorney, Agent, or Firm* — Seed IP Law Group LLP

(57) ABSTRACT

Embodiments of the disclosure are related to a backlight unit and a display device, by disposing a filter reflecting a green light of a long wavelength on a color conversion sheet and disposing a filter reflecting a green light and a red light under the color conversion sheet, a wavelength band of a light supplied to a display panel is controlled and a color reproduction range may be improved while increasing a light efficiency. Furthermore, by disposing a sheet increasing an amount of a vertical light on the color conversion sheet, a wavelength band of a light reflected by a filter disposed on the color conversion sheet is controlled exactly and the backlight unit and the display device capable of a wide color gamut may be provided.

19 Claims, 18 Drawing Sheets

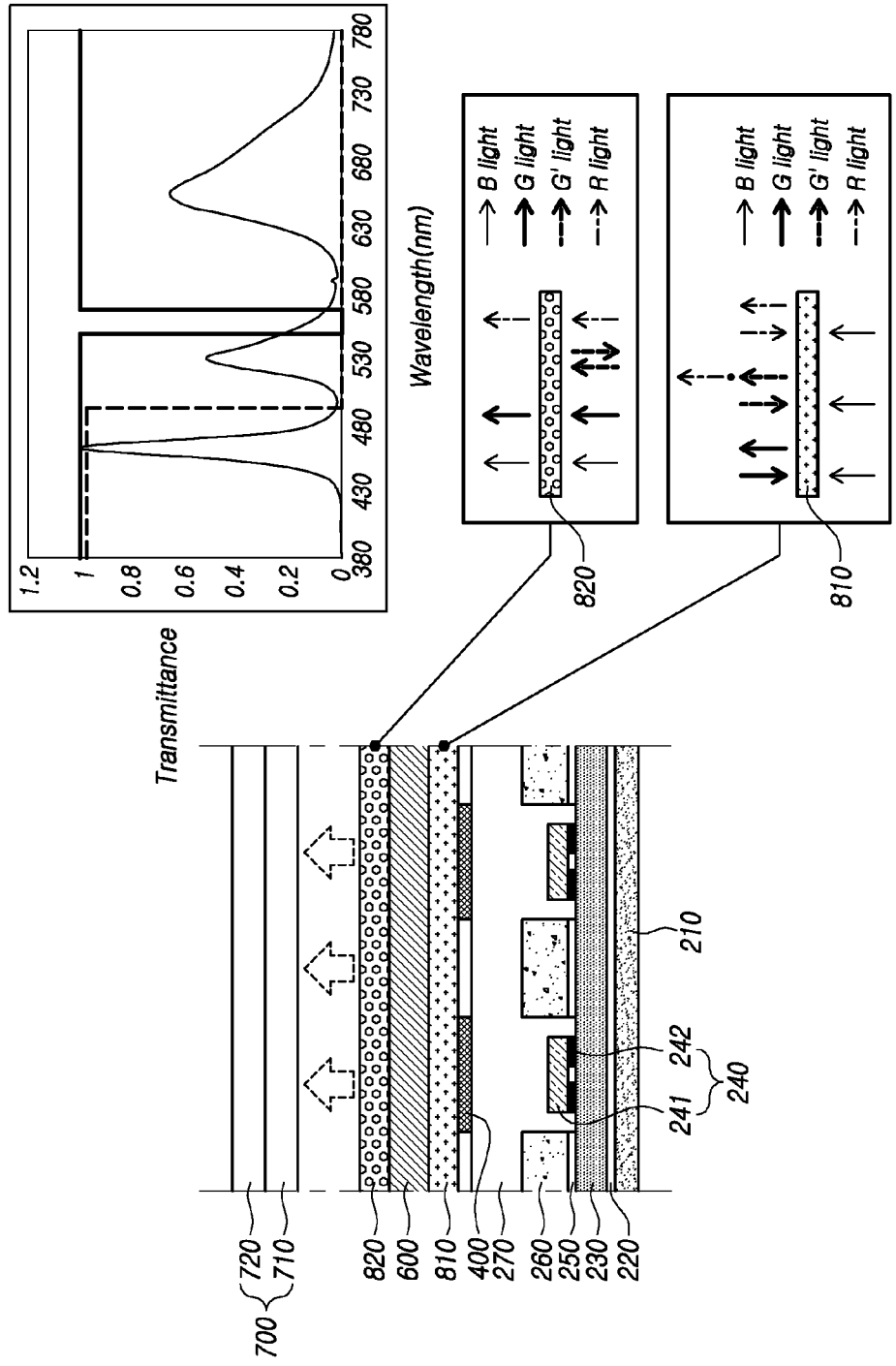

FIG. 7
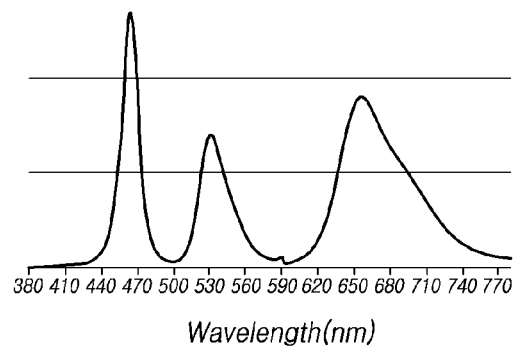
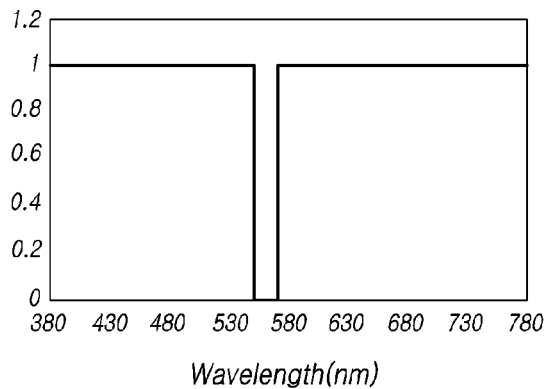
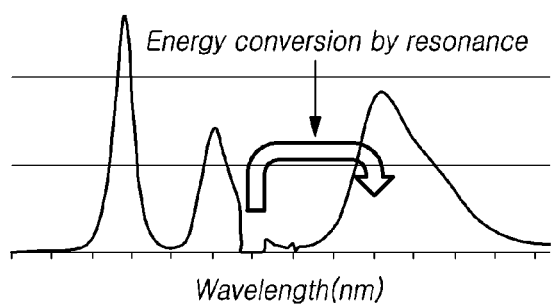

FIG.8
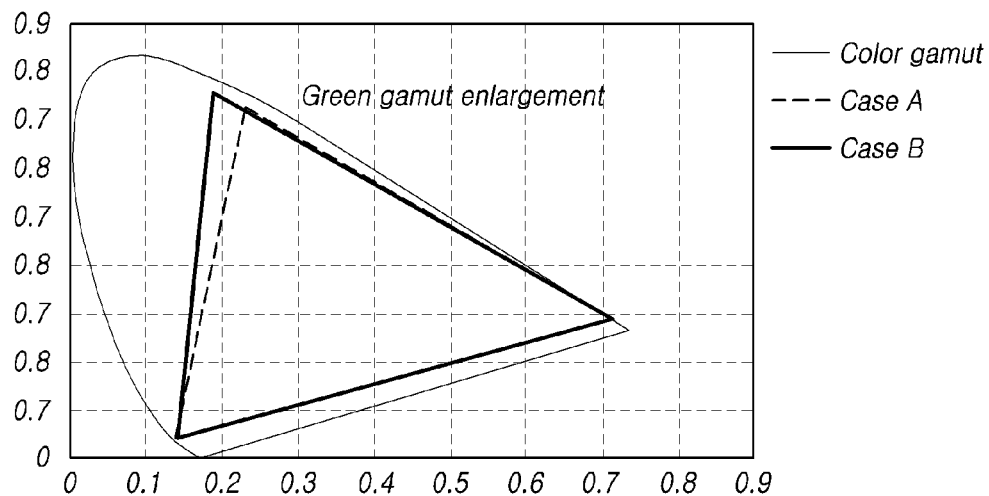
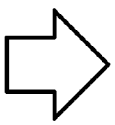
< Case A >
| Item | x | y |
|---|---|---|
| Red | 0.7089 | 0.2903 |
| Green | 0.2298 | 0.7288 |
| Blue | 0.1393 | 0.0429 |
| White | 0.3130 | 0.3290 |
< Case B >
| Item | x | y |
|---|---|---|
| Red | 0.7099 | 0.2894 |
| Green | 0.1876 | 0.7577 |
| Blue | 0.1392 | 0.0444 |
| White | 0.3130 | 0.3290 |

BACKLIGHT UNIT WITH REFLECTION FILTERS AND DISPLAY DEVICE COMPRISING THE SAME

CROSS REFERENCE TO RELATED APPLICATION

This application claims priority from Korean Patent Application No. 10-2019-0128958, filed on Oct. 17, 2019, which is hereby incorporated by reference for all purposes as if fully set forth herein.

BACKGROUND

Technical Field

Embodiments of the disclosure are related to backlight units and display devices.

Description of the Related Art

The growth of the information society leads to increased demand for display devices to display images and use of various types of display devices, such as a liquid crystal display device, an organic light emitting display device, etc.

The liquid crystal display device of these display devices may comprise a display panel and a backlight unit supplying a light to the display panel. And the backlight unit may comprise a light source emitting a light, and various optical members.

The backlight unit may comprise a light source emitting a white color light and supply the white light to the display panel, in some cases, excite a light of a short wavelength to supply the white color light to the display panel.

In this case, since a spectrum of the white color light is determined by a color conversion material exciting a light of a short wavelength, a color reproduction range may be determined by the color conversion material. Thus, since the color reproduction range is dependent on the color conversion material included in the backlight unit, a limit may be present in increasing the color reproduction range of the backlight unit.

BRIEF SUMMARY

Embodiments of the disclosure provide a method improving a color reproduction range shown by a backlight unit which supplies a white color light by exciting a light of a short wavelength without changing kinds or amounts of a color conversion material.

Embodiments of the disclosure provide a method increasing a light efficiency of the backlight unit and improving an image quality while improving the color reproduction range shown by the backlight unit.

According to various embodiments of the disclosure, a backlight unit comprises a plurality of light sources, at least one light source protection portion disposed on the light source, a first reflection filter positioned on the light source protection portion and reflecting at least a part of a light of a wavelength band other than a wavelength band of a light emitted from the light source and comprising a plurality of light conversion patterns disposed on at least one surface of a top surface and a bottom surface, a color conversion sheet positioned on the first reflection filter, and a second reflection filter positioned on the color conversion sheet and reflecting a light of a part wavelength band of a wavelength band of a light reflected by the first reflection filter.

Here, the light source may emit a blue light, the first reflection filter may reflect a green light and a red light, and the second reflection filter may reflect a light of a part wavelength band of the green light.

The part wavelength band of the green light reflected by the second reflection filter may be positioned between a peak wavelength of the green light and a peak wavelength of the red light.

Furthermore, the backlight unit may further comprise a light path control sheet positioned between the color conversion sheet and the second reflection filter.

And the light path control sheet may comprise a first layer positioned adjacent to the color conversion sheet and having a first refractive index, and a second layer positioned adjacent to the second reflection filter and disposed as a shape meshed with the first layer and having a second refractive index greater than the first refractive index.

At least a part of a top surface of the light path control sheet and at least a part of a bottom surface of the second reflection filter may be contacted directly each other.

An air layer may be present in at least a part region between a top surface of the light path control sheet and a bottom surface of the second reflection filter.

The second reflection filter may comprise a light path control pattern disposed on a bottom surface of the second reflection filter, comprising an inclined surface, and having a refractive index greater than a refractive index of an air.

The backlight unit may further comprise a reflection plate disposed on at least a part of an area except for an area where the light sources are disposed.

The reflection plate may comprise a plurality of holes positioned in an area on where the light source is disposed, the light source protection portion is disposed as a shape being filled in each of the plurality of holes, and the light source protection portions disposed in adjacent holes may be separated from each other.

The light conversion pattern may be disposed on the top surface of the first reflection filter, and the first reflection filter may be disposed on the light source protection portion and the reflection plate.

A top surface of the light source protection portion may be a convex shape.

Each of the plurality of light conversion patterns may be positioned to be corresponded with each of the plurality of light sources, and change a path of at least a part of a light emitted from the light source.

The backlight unit may further comprise a diffusion plate disposed between the first reflection filter and the color conversion sheet.

According to various embodiments of the disclosure, a backlight unit comprises a plurality of light sources, at least one light source protection portion disposed on the light source, a first reflection filter positioned on the light source protection portion and reflecting at least a part of a light of a wavelength band other than a wavelength band of a light emitted from the light source and comprising a plurality of light conversion patterns disposed on at least one surface of a top surface and a bottom surface, a color conversion sheet position on the first reflection filter, and a second reflection filter positioned on the color conversion sheet and reflecting a light of a part wavelength band of a wavelength band of a light reflected by the first reflection filter and wherein a light path control pattern comprising an inclined surface and having a refractive index greater than a that of an air is disposed on a bottom surface of the second reflection filter.

The light conversion pattern may reflect at least a part of a light reached to the light conversion pattern to downside of the light conversion pattern, and the light path control pattern may reflect at least a part of a light reached to the light path control pattern to upside of the light path control pattern.

According to various embodiments of the disclosure, a display device comprises a display panel comprising a plurality of subpixels and displaying an image, and an above-mentioned backlight unit disposed on a side opposite to a side on which the display panel displays the image.

According to various embodiments of the disclosure, by reflecting a light of a part wavelength band of a green light on the color conversion sheet and reflecting a reflected light again under the color conversion sheet to excite to a red light, a color reproduction range shown by the backlight unit may be improved.

According to various embodiments of the disclosure, by disposing, under the color conversion sheet, a filter reflecting a red light and a green light and comprising the light conversion pattern, a light efficiency of the backlight unit may be increased and an image quality shown by the backlight unit may be improved.

BRIEF DESCRIPTION OF THE SEVERAL VIEWS OF THE DRAWINGS

The above and other objects, features, and advantages of the present disclosure will be more clearly understood from the following detailed description, taken in conjunction with the accompanying drawings, in which:

FIG. 6 is a view illustrating other example of a structure of the backlight unit according to various embodiments of the disclosure;

FIGS. 7 and 8 are views illustrating an example of an improvement effect of a color reproduction range by the backlight unit illustrated in FIG. 6.

DETAILED DESCRIPTION

Figure 1:
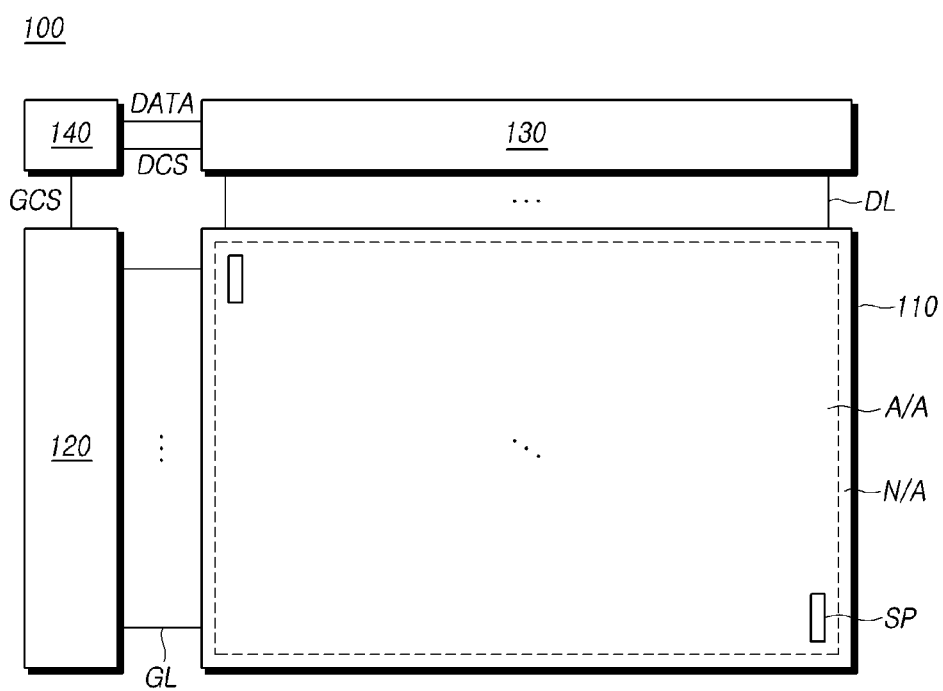
FIG. 1 is a view schematically illustrating a configuration of a display device according to various embodiments of the disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(a)", or "(b)" may be used herein to describe elements of the present disclosure. Each of these terms is not used to define essence, order, sequence, or number of elements, etc., but is used merely to distinguish the corresponding element from other elements.

When it is mentioned that a first element "is connected or coupled to", "contacts or overlaps", etc., a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc., each other via a fourth element. Here, the second element may be included in at least one of two or more elements that "are connected or coupled to", "contact or overlap", etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

FIG. 1 is a view schematically illustrating a configuration of a display device 100 according to various embodiments of the disclosure.

Referring to FIG. 1, the display device 100 may include a display panel 110 including an active area AA and a non-active area NA, and a gate driving circuit 120, a data driving circuit 130, and a controller 140 for driving the display panel 110.

The display panel 110 may include a plurality of gate lines GL, a plurality of data lines DL, and subpixels SP at the crossings of the gate lines GL and the data lines DL.

The gate driving circuit 120 may be controlled by the controller 140 to sequentially output scan signals to the plurality of gate lines GL disposed in the display panel 110, thereby controlling the driving timing of the subpixels SP.

The gate driving circuit 120 may include one or more gate driver integrated circuits (GDICs). Depending on driving schemes, the gate driving circuit 120 may be positioned on only one side, or each of two opposite sides, of the display panel 110.

Each gate driver integrated circuit (GDIC) may be connected to a bonding pad of the display panel 110 by a tape automated bonding (TAB) scheme or a chip on glass (COG) scheme, or may be directly disposed on the display panel 110 by implementing as a GIP (Gate In Panel) type, in some cases, may be integrated and disposed on the display panel 110. Furthermore, each gate driver integrated circuit (GDIC) may be implemented by a chip on film (COF) scheme which each gate driver integrated circuit (GDIC) is mounted on a film connected to the display panel 110.

The data driving circuit 130 receives image data from the controller 140 and converts the image data into an analog data voltage. The data driving circuit 130 outputs a data voltage to each data line DL according to the timing of applying a scan signal via the gate line GL, thereby allowing each subpixel SP to represent a brightness according to the image data.

The data driving circuit 130 may include one or more source driver integrated circuits (SDICs).

Each source driver integrated circuit (SDIC) may include a shift register, a latch circuit, a digital to analog converter, an output buffer, and the like.

Each source driver integrated circuit (SDIC) may be connected to a bonding pad of the display panel 110 by a tape automated bonding (TAB) scheme or a chip on glass (COG) scheme, or may be directly disposed on the display panel 110, in some cases, may be integrated and disposed on the display panel 110. Furthermore, each source driver integrated circuit (SDIC) may be implemented by a chip on film (COF) scheme, in this case, each source driver integrated circuit (SDIC) may be mounted on a film connected to the display panel 110 and electrically connected to the display panel 110 through wires on the film.

The controller 140 supplies various control signals to the gate driving circuit 120 and the data driving circuit 130 and controls the operation of the gate driving circuit 120 and the data driving circuit 130.

The controller 140 is mounted on a printed circuit board, a flexible printed circuit, and the like, and electrically connected to the gate driving circuit 120 and the data driving circuit 130 through the printed circuit board, the flexible printed circuit, and the like.

The controller 140 enables the gate driving circuit 120 to output scan signals according to the timing of implementing each frame, converts image data received from the outside to meet the data signal format used by the data driving circuit 130, and outputs the resultant image data to the data driving circuit 130.

The controller 140 receives, from the outside (e.g., a host system), various timing signals including a vertical synchronization signal VSYNC, a horizontal synchronization signal HSYNC, an input data enable signal DE, and a clock signal, along with the image data.

The controller 140 may generate a diversity of control signals using the timing signals received from the outside and output the control signals to the gate driving circuit 120 and the data driving circuit 130.

As an example, to control the gate driving circuit 120, the controller 140 outputs various gate control signals GCS including a gate start pulse GSP, a gate shift clock GSC, and a gate output enable signal GOE.

The gate start pulse GSP controls the operation start timing of one or more gate driver integrated circuits (GDICs) constituting the gate driving circuit 120. The gate shift clock GSC is a clock signal commonly input to one or more gate driver integrated circuits (GDICs) and controls the shift timing of the scan signals. The gate output enable signal GOE designates timing information about one or more gate driver integrated circuits (GDICs).

To control the data driving circuit 130, the controller 140 outputs various data control signals DCS including, e.g., a source start pulse SSP, a source sampling clock SSC, and a source output enable signal SOE.

The source start pulse SSP controls the data sampling start timing of one or more source driver integrated circuits (SDICs) constituting the data driving circuit 130. The source sampling clock SSC is a clock signal for controlling the sampling timing of data in each source driver integrated circuit (SDIC). The source output enable signal SOE controls the output timing of the data driving circuit 130.

The display device 100 may further include a power management integrated circuit that supplies various voltages or currents to, e.g., the display panel 110, the gate driving circuit 120, and the data driving circuit 130 or controls various voltages or currents to be supplied.

Each of subpixels SPs is an area defined by crossing the gate line GL and the data line DL, and according to a type of the display device 100, a liquid crystal or a light emitting element may be disposed in the subpixel SP.

For example, in a case that the display device 100 is a liquid crystal display device, the display device 100 comprises a light source device like a backlight unit supplying a light to the display panel, and a liquid crystal is disposed in the subpixel SP of the display panel 110. And by controlling arrangements of the liquid crystal by an electric field formed according to applying a data voltage to each of the subpixels SP, a brightness according to the image data may be shown and an image may be displayed.

FIGS. 2, 3A, 3B, 3C, 3D and 3E are views illustrating an example of a structure of a backlight unit included in the display device 100 according to various embodiments of the disclosure.

Figure 2:
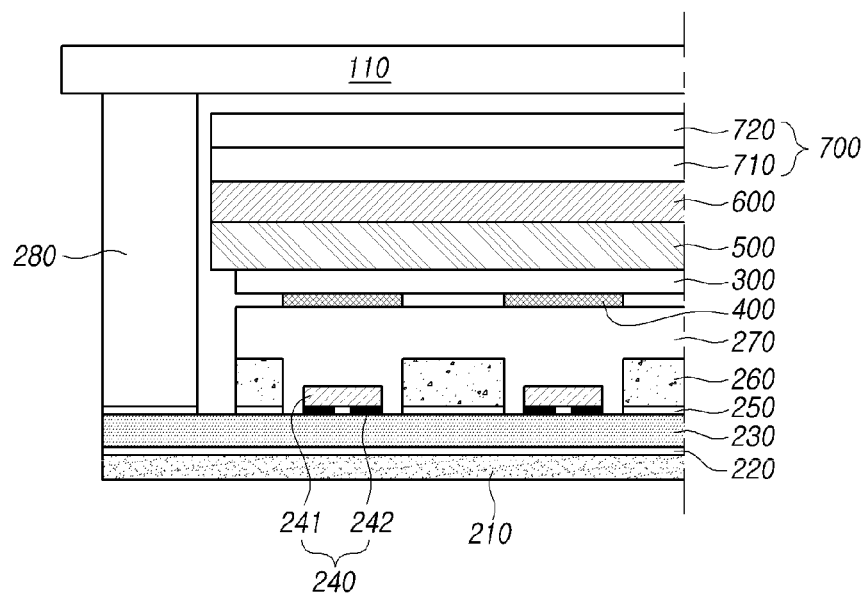
FIGS. 2, 3A, 3B, 3C, 3D and 3E are views illustrating an example of a structure of a backlight unit included in the display device according to various embodiments of the disclosure.

Referring to FIG. 2, the display device 100 may comprise the display panel 110, and the backlight unit disposed under the display panel 110 and supplying a light to the display panel 110.

For example, the backlight unit may comprise a plurality of light sources 240 disposed on a printed circuit 230. The printed circuit 230 may be disposed as a state being stick on a plate 210 by a first adhesive tape 220.

Here, the plate 210 may be a cover bottom according to types of the display device 100. And a dam 280 may be disposed outside of an area where the light source 240 and an optical member or the like are disposed on the plate 210 to support the display panel 110.

The light source 240 may comprise a light emitting portion 241 emitting a light, and an electrode portion 242 being applied with a signal for driving the light emitting portion 241. This light source 240 may emit a white color light, or in some cases, may emit a light of a certain wavelength band. For example, the light source 240 emits a blue light, the blue light is excited through an optical member disposed on the light source 240, and a white color light may be supplied to the display panel 110.

A reflection plate 260 may be disposed on the printed circuit 230. The reflection plate 260 may be disposed as a state being stick on the printed circuit 230 by a second adhesive tape 250. The reflection plate 260 may comprise a plurality of holes, and the light source 240 may be disposed inside of the hole included in the reflection plate 260. That is, the reflection plate 260 providing a reflection function may be disposed on at least a part of an area where the light source 240 is not disposed on the printed circuit 230.

A top surface of the reflection plate 260 may be positioned higher than a top end of the light source 240 disposed in the hole. And a light source protection portion 270 may be disposed inside of the hole of the reflection plate 260 and on the reflection plate 260.

The light source protection portion 270 may protect the plurality of light sources 240, and may provide a function spreading a light emitted from the light source 240. That is, the light source protection portion 270 is contact with the light source 240 directly and protects the light source 240, and may provide a light guide function.

A light conversion sheet 300 may be disposed on the light source protection portion 270, and the light conversion sheet 300, for example, may be a transparent film. And a plurality of light conversion patterns 400 may be disposed on at least one surface of a top surface and a bottom surface of the light conversion sheet 300.

The plurality of light conversion patterns 400 may be light control patterns, and each of the light conversion patterns 400 may be disposed on positions corresponding to each of the plurality of light sources 240 on the bottom surface of the light conversion sheet 300. For example, each of the plurality of light conversion patterns 400 may be disposed to correspond to the hole formed in the reflection plate 260. And in some cases, an area of the light conversion pattern 400 may be same with an area of horizontal cross-section the hole of the reflection plate 260.

The light conversion pattern 400 may scatter, reflect or diffract a part of a light output in a vertical direction from the light source 240. Furthermore, the light conversion pattern 400 may be a light control pattern being capable of transmitting a part of a light emitted from the light source 240.

That is, as the light conversion pattern 400 is disposed on an area where an intensity of a light emitted from the light source 240 is the strongest, a luminance deviation or the like between an area where the light source 240 is disposed on (an area where amounts of a light is much) and an area between the light sources 240 (an area where amounts of a light is little) may be reduced.

A diffusion plate 500 may be disposed on the light conversion sheet 300 to spread a light being entered from a lower part.

A color conversion sheet 600 may be disposed on the diffusion plate 500 to change a wavelength band of a light emitted from the light source 240. And one or more optical sheet 700 may be disposed on the color conversion sheet 600, for example, a prism sheet 710 and a diffusion sheet 720 or the like may be disposed.

Describing more specifically referring to FIGS. 3A to 3E, the plurality of light source 240 are disposed on the printed circuit 230.

These light sources 240, for example, may be a light emitting diode LED, or a mini light emitting diode Mini LED of a small size or a micro light emitting diode pLED of subminiature. Thus, as the light source 240 of a chip type may be disposed in a form of being mounted on the printed circuit 230, a thickness of the backlight unit may be reduced.

And the light source 240 may emit a white color light, in some cases, may emit a light of a certain wavelength band (e.g., a wavelength band of a blue light).

Figure 3A:
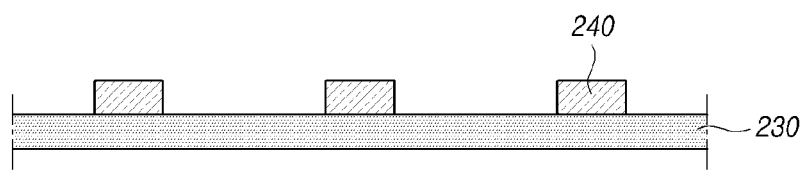
Figure 3B:
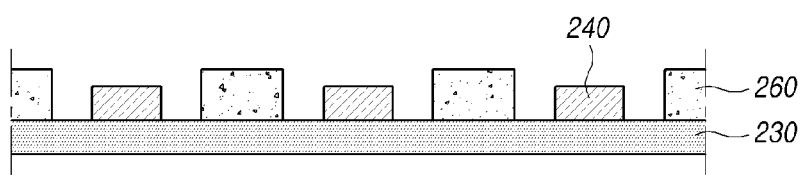

Referring to FIG. 3B, the reflection plate 260 may be disposed on at least a part of an area except for an area where the light source 240 is disposed on the printed circuit 230. This reflection plate 260 may be fabricated as a shape that an area corresponding to the light source 240 is opened, and may be disposed as being settled on the printed circuit 230. And the reflection plate 260 may reflect a light emitted from the light source 240 to a front surface of the backlight unit to increase a light efficiency of the backlight unit.

Here, in a case that the light source 240 is disposed as a chip type, since a size of the light source 240 is small, a height of the reflection plate 260 may be greater than a height of the light source 240. That is, a top surface of the reflection plate 260 may be positioned higher than a top end of the light source 240.

Accordingly, a light emitted to a side direction of the light source 240 may be reflected at a side surface of the reflection plate 260 to be output to a front surface of the backlight unit, and thereby the light efficiency of the backlight unit may be increased more.

Furthermore, in some cases, a reflection film coated on the printed circuit 230 may be disposed.

That is, the reflection film may be coated on a whole surface of the printed circuit 230 or an area except for an area where the light source 240 is disposed, thereby increasing the light efficiency.

In these cases, the reflection film coated on the printed circuit 230 may substitute a function of the reflection plate 260, or may provide a reflection function with the reflection plate 260 disposed together.

Figure 3C:
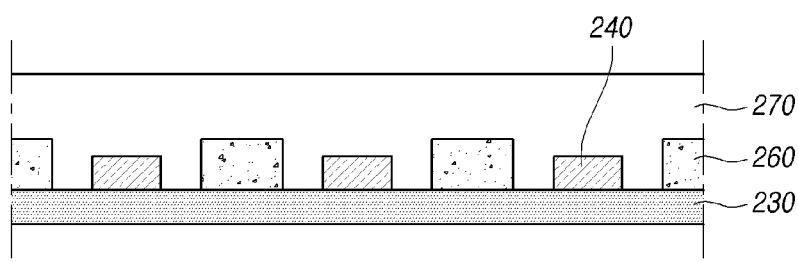

Referring to FIG. 3C, the light source protection portion 270 may be disposed on the plurality of light sources 240 and the reflection plate 260.

The light source protection portion 270, for example, may be constituted of a resin.

In a case that the light source protection portion 270 is constituted of a resin, the light source protection portion 270 may be formed by spreading a resin inside of walls, after disposing the walls outside of the printed circuit 230 or on a peripheral area of an area where the plurality of light sources 240 are disposed on the printed circuit 230.

Furthermore, in some cases, the light source protection portion 270 may be filled inside of the hole of the reflection plate 260, and the light source protection portion 270 disposed in adjacent holes may be disposed as a structure being separated from each other. That is, the light source protection portion 270 may expose a top surface of the reflection plate 260, and it may be a structure that an optical member positioned on the light source protection portion 270 may be disposed on the light source protection portion 270 and the reflection plate 260 directly.

This light source protection portion 270 may perform a function protecting the plurality of light sources 240 disposed on the printed circuit 230, and also may provide a light guide function to spread a light emitted from the light source 240.

That is, a light emitted from the light source 240 may be spread evenly to a top surface of the light source protection portion 270 by the light source protection portion 270 as much as possible.

Furthermore, according to various embodiments of the disclosure, as the light conversion pattern 400, on the light source protection portion 270, is disposed on a position corresponding to the light source 240, a uniformity of an image may be improved more while reducing a thickness of the backlight unit.

Figure 3D:
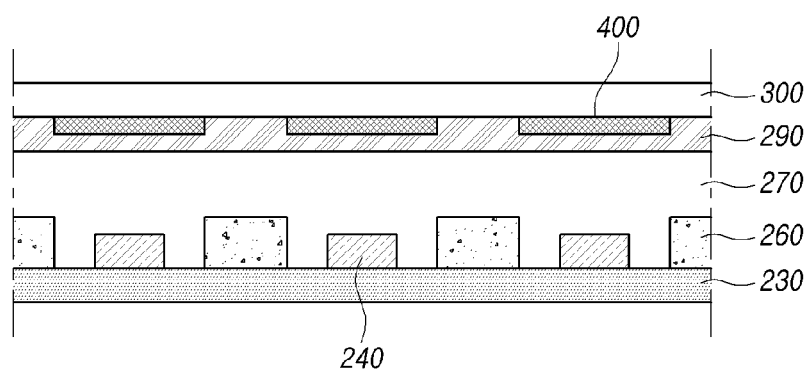

Referring to FIG. 3D, the light conversion sheet 300 may be disposed on the light source protection portion 270. And the plurality of light conversion patterns 400 may be disposed on a bottom surface of the light conversion sheet 300, but not limited to this, the plurality of light conversion patterns 400 may be disposed on a top surface of the light conversion sheet 300. The light conversion sheet 300 may be stick on the light source protection portion 270 by an adhesive layer 290.

The adhesive layer 290 may be optical clear adhesive OCA. And the light conversion sheet 300, for example, may be constituted of PET or the like, but not limited to this.

Each of the plurality of light conversion patterns 400 disposed on a bottom surface of the light conversion sheet 300 may be disposed to be corresponded to each of the plurality of light sources 240 disposed on the printed circuit 230.

That is, at least a part of the light conversion pattern 400 may be disposed to be overlapped with the light source 240, and when considering a spread characteristic of a light, the light conversion pattern 400 may be disposed on an area including an area where the light source 240 is disposed.

The light conversion pattern 400 may have a constant reflectance, and may scatter, reflect, diffract or transmit a part of a light emitted from the light source 240.

For example, the light conversion pattern 400 may scatter a light emitted from the light source 240 and may make the light to be output in a vertical direction and a diagonal direction. Alternatively, the light conversion pattern 400 may reflect a light emitted from the light source 240 and may make the light to be reflected again by the reflection plate 260 and may make the light to be output to an area between the light sources 240.

In this way, as controlling an output direction of a light emitted from the light source 240 by the light conversion pattern 400, an image quality of the backlight unit may be improved. That is, as a light emitted from the light source 240 is scattered, reflected, diffracted or transmitted, a luminance uniformity of the backlight unit may be improved.

Figure 3E:
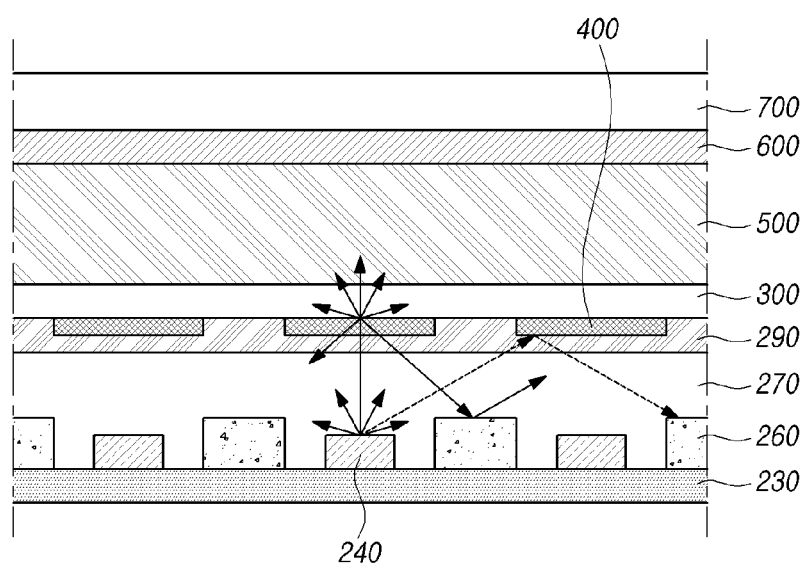

Referring to FIG. 3E, the diffusion plate 500 may be disposed on the light conversion sheet 300, and the color conversion sheet 600 may be disposed on the diffusion plate 500. And one or more optical sheet 700 may be disposed on the color conversion sheet 600.

Here, positions where the diffusion plate 500 and the color conversion sheet 600 are disposed may be changed each other.

The diffusion plate 500 spreads a light being output through the light conversion sheet 300.

The color conversion sheet 600 may emit a light of a certain wavelength band by reacting to a light being entered.

For example, in a case that the light source 240 emit a light of a first wavelength band (e.g., a blue light), the color conversion sheet 600 may emit a light of a second wavelength band (e.g., a green light) and a light of a third wavelength band (e.g., a red light) by reacting to a light being entered.

This color conversion sheet 600, in some cases, may be disposed on a part area on the diffusion plate 500.

For example, in a case that the light source 240 emits a blue light, the color conversion sheet 600 may be disposed only on an area except for an area corresponding to an area where a blue subpixel SP is disposed in the display panel 110. That is, a light which doesn't go through the color conversion sheet 600 may be reached to the blue subpixel SP of the display panel 110.

This color conversion sheet 600 may not be disposed according to the light source 240.

For example, in cases that the light source 240 emits a white color light, or a color conversion film emitting a green light and a red light is coated on an output surface of the light source 240 emitting a blue light, or the like, the color conversion sheet 600 may not be disposed.

In this way, according to various embodiments of the disclosure, by comprising the light conversion sheet 300 comprising the light conversion pattern 400 disposed on a position corresponding to the light source 240 and various optical members, it may provide the backlight unit satisfying the image quality while reducing a thickness of the backlight unit.

And the light conversion pattern 400 disposed on the light conversion sheet 300 may be disposed as various structures.

Figure 4:
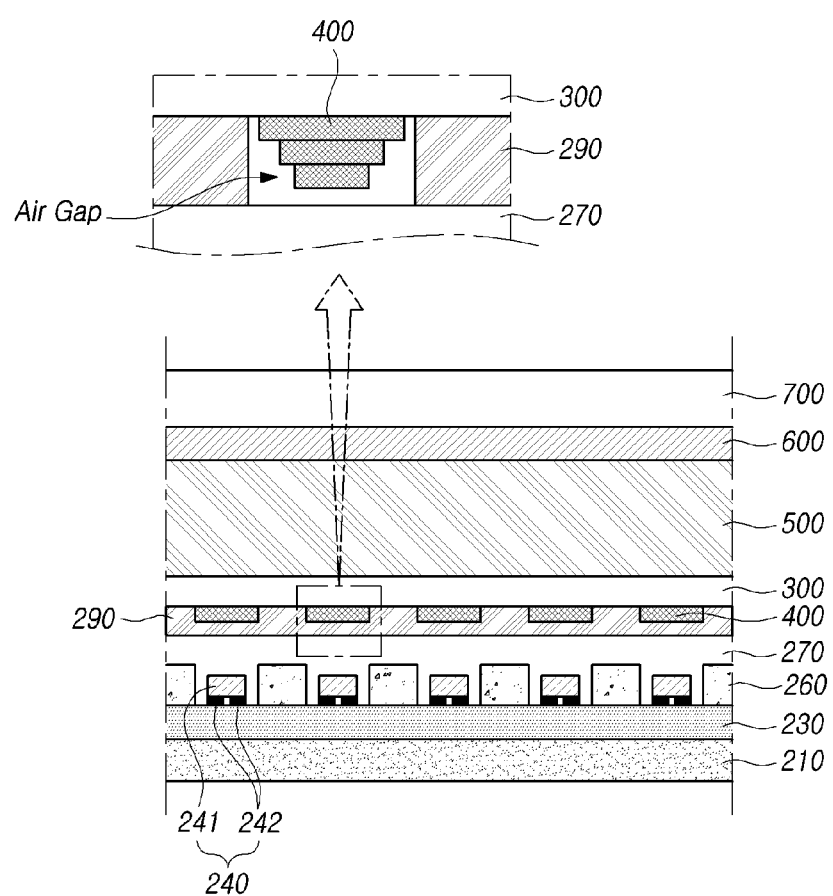
FIG. 4 is a view illustrating an example of a structure of a light conversion pattern included in the backlight unit according to various embodiments of the disclosure.

FIG. 4 is a view illustrating an example of a structure of the light conversion pattern 400 included in the backlight unit according to various embodiments of the disclosure.

Referring to FIG. 4, the printed circuit 230 may be disposed on the plate 210, and the plurality of light source 240 may be disposed on the printed circuit 230. And the reflection plate 260 may be disposed on at least a part of an area except for an area where the light source 240 is disposed on the printed circuit 230.

Here, the light source 240, for example, may be a light emitting diode LED, and may comprise a light emitting portion 241 comprising an n-type semiconductor layer, an active layer and a p-type semiconductor layer, and an electrode portion 242.

The light source protection portion 270 is disposed on the plurality of light sources 240 and the reflection plate 260.

The light conversion sheet 300 may be disposed on the light source protection portion 270, and the light conversion pattern 400 may be disposed on a position corresponding to the light source 240 on a bottom surface of the light conversion sheet 300. And the diffusion plate 500, the color conversion sheet 600 and the optical sheet 700 or the like may be disposed on the light conversion sheet 300.

The light conversion pattern 400 disposed on a bottom surface of the light conversion sheet 300 may be implemented by printing a material having a characteristic blocking a light on the light conversion sheet 300.

For example, the light conversion pattern 400 may be disposed by a method printing a $TiO_2$ on the light conversion sheet 300. In a case that the light conversion pattern 400 uses $TiO_2$, when being one layer, a reflectance may be 60~70%. Furthermore, an absorption/transmittance may be 30~40%.

Furthermore, the light conversion pattern 400 disposed on a bottom surface of the light conversion sheet 300 may be disposed as one layer, or may be disposed as a structure of multiple layers.

For example, the light conversion pattern 400 may be disposed as two layers, when the light conversion pattern 400 is two layers, a reflectance may be 70~80%. Furthermore, an absorption/transmittance may be 20~30%. But, a reflectance of the light conversion pattern 400 is not limited to this, if an amount of $TiO_2$ included in the light conversion pattern 400 or a thickness of a layer of the light conversion pattern 400 increase, a reflectance of the light conversion pattern 400 is increased and a transmittance is decreased.

Furthermore, in some cases, as an example illustrated in FIG. 4, the light conversion pattern 400 disposed on a bottom surface of the light conversion sheet 300 may be constituted of three layers.

This light conversion pattern 400 may be implemented by a method printing a light-blocking material three times on the light conversion sheet 300, and an area of the light-blocking material printed may become gradually smaller. And by overturning the light conversion sheet 300 which the light conversion pattern 400 is disposed and disposing on the light source protection portion 270, the light conversion pattern 400 may be disposed on the light source 240.

Accordingly, an area of the light conversion pattern 400 may be gradually narrowed toward a downside from the light conversion sheet 300, and a thickness of a central part of the light conversion pattern 400 may be greater than a thickness of a peripheral part of the light conversion pattern 400.

That is, since an intensity of a light emitted in a vertical direction from the light source 240 is the strongest, the central part of the light conversion pattern 400 may be disposed thicker.

In this way, as the light conversion pattern 400 is disposed on the light source 240, a path of a light emitted from the light source 240 in a vertical direction is converted and it may be prevented that a hot spot is shown on an area where the light source 240 is disposed.

The light conversion sheet 300 in which the light conversion pattern 400 is disposed may be stick on the light source protection portion 270 by the adhesive layer 290.

The adhesive layer 290 may be disposed on at least a part of an area except for an area where the light conversion pattern 400 is disposed on a bottom surface of the light conversion sheet 300.

Accordingly, the adhesive layer 290 may not be disposed on an area where the light conversion pattern 400 is disposed, and an air gap may be present between the light conversion pattern 400 and the light source protection portion 270.

Furthermore, a side portion of the light conversion pattern 400 and the adhesive layer 290 may be spaced apart from each other.

As the air gap is present between the light conversion pattern 400 and the light source protection portion 270, a light output to a side direction of the light conversion pattern 400 may be reflected by the air gap.

That is, a light output to a side direction of the light conversion pattern 400 may be output as a large refractive angle by an air layer having a lower refractive index, or may be reflected at the air layer. And a light reflected at the air layer may be reflected again by the reflection plate 260 to be output, the light efficiency may be increased while assisting a light-blocking function of the light conversion pattern 400.

In this way, by a structure that the light conversion pattern 400 and the air gap are disposed on a position corresponding to the light source 240, the light efficiency of the backlight unit may be increased while preventing the hot spot.

Furthermore, the light conversion pattern 400 disposed on a lower part of the light conversion sheet 300 may be disposed as a different structure according to disposed positions.

Figure 5A:
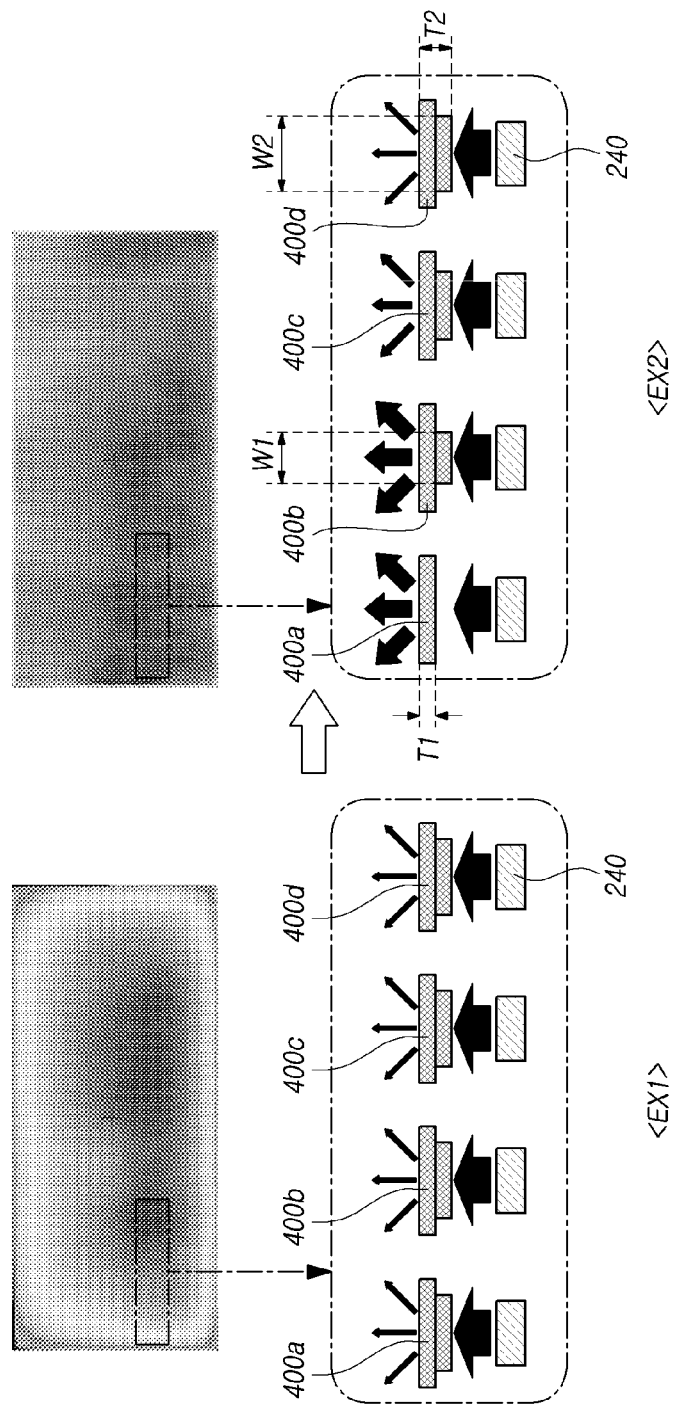
FIGS. 5A and 5B are views illustrating examples of structures according to disposed positions of the light conversion pattern included in the backlight unit according to various embodiments of the disclosure.
Figure 5B:
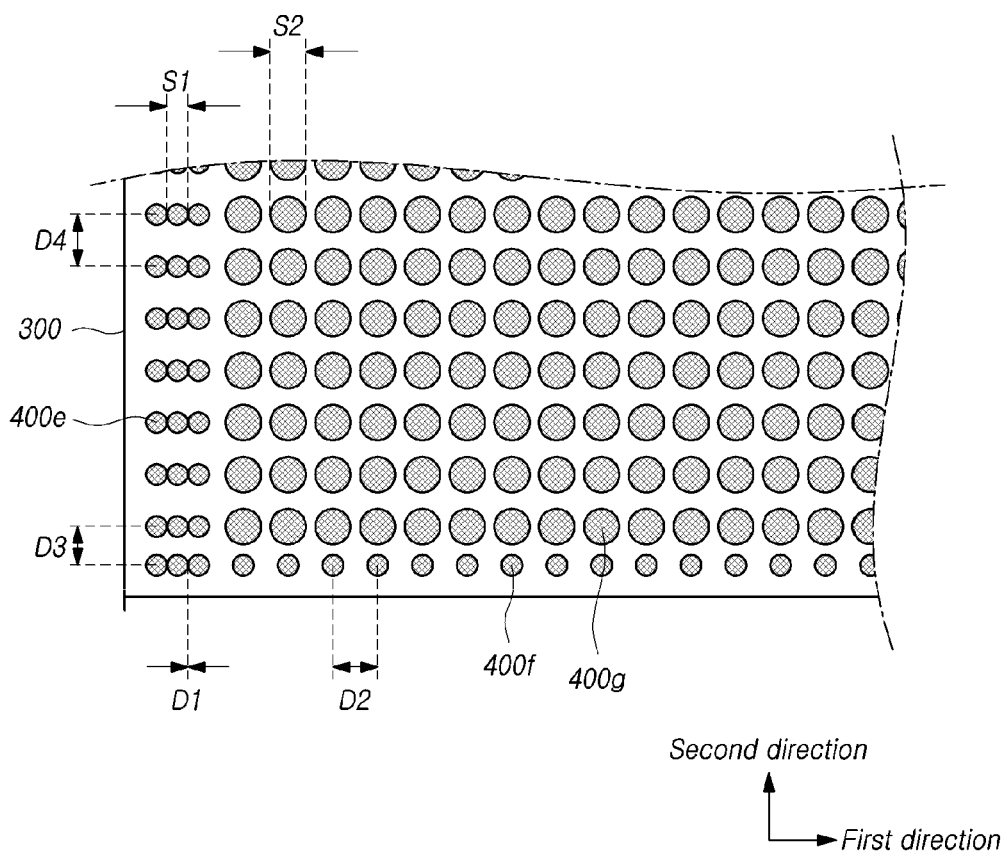

FIGS. 5A and 5B are views illustrating examples of structures according to disposed positions of the light conversion pattern 400 included in the backlight unit according to various embodiments of the disclosure.

Referring to FIG. 5A, as an example of luminance displayed through the backlight unit according to a structure of the light conversion pattern 400, EX1 shows an example of luminance measured in a case that the light conversion pattern 400 is disposed as a constant structure, and EX2 shows an example of luminance measured in a case that the light conversion pattern 400 is disposed as a different structure according to a position.

As illustrated in EX1 of FIG. 5A, in a case that a structure of the light conversion pattern 400*a* disposed on a peripheral area and a structure of the light conversion pattern 400*d* disposed on a central area are same, a luminance of the peripheral area of the backlight unit may be shown low.

That is, since the number of the light source 240 supplying a light to the peripheral area of the backlight unit is relatively small, in a case that the light conversion pattern 400 having a light-blocking characteristic of same level is disposed, a luminance of the peripheral area of the backlight unit may be low comparing to that of the central area of the backlight unit.

Accordingly, as illustrated in EX2 of FIG. 5A, by disposing the light conversion pattern 400 that a structure of the light conversion pattern 400*a* disposed on the peripheral area of the backlight unit and a structure of the light conversion pattern 400*d* disposed on the central area are different, a luminance reduction of the peripheral area of the backlight unit may be prevented and overall luminance may be even.

For example, the light conversion pattern 400 may be disposed so that a thickness T1 of the light conversion pattern 400*a* disposed on the peripheral area of the backlight unit is smaller than a thickness T2 of the light conversion pattern 400*d* disposed on the central area.

Alternatively, the light conversion pattern 400 may be disposed so that an area W1 of the thickest portion of the light conversion pattern 400*b* disposed adjacent to the peripheral area of the backlight unit is smaller than an area W2 of the thickest portion of the light conversion pattern 400*d* disposed on the central area. That is, an area of a portion having a high light-blocking characteristic of the light conversion patterns 400*a*, 400*b* disposed on the peripheral area or an area adjacent to the peripheral area of the backlight unit may be small.

Furthermore, the light conversion pattern 400 may be disposed so that a thickness of the light conversion pattern 400 gradually decreases from the central area to the peripheral area of the backlight unit, or an area of the thickest portion of the light conversion pattern 400 gradually decreases from the central area to the peripheral area of the backlight unit.

Furthermore, in some cases, the light source 240 may be disposed so that the number of the light source 240 or a distance between the light sources 240 may be disposed differently in the central area and the peripheral area of the backlight unit, and the light conversion pattern 400 may be disposed differently in the central area and the peripheral area of the backlight unit.

Referring to FIG. 5B, it shows another example of a structure that the light conversion pattern 400 is disposed on a bottom surface of the light conversion sheet 300.

Here, a distance between the light sources 240 disposed on the peripheral area of the backlight unit may be smaller than a distance between the light sources 240 disposed on the central area of the backlight unit. That is, the light source 240 may be disposed as a more dense structure in the peripheral area of the backlight unit so that a luminance of the central area and the peripheral area of the backlight unit are even.

And a distance between the light conversion patterns 400 disposed on the peripheral area of the backlight unit may be different from a distance between the light conversion pattern 400 disposed on the central area, since the light conversion pattern 400 disposed on a bottom surface of the light conversion sheet 300 is disposed to be corresponded to the light source 240.

For example, a distance D1 in a first direction between the light conversion patterns 400 disposed on the peripheral area of the backlight unit may be smaller than a distance D2 in the first direction between the light conversion patterns 400 disposed on the central area. Furthermore, a distance D3 in a second direction between the light conversion patterns 400 disposed on the peripheral area of the backlight unit may be smaller than a distance D4 in the second direction between the light conversion patterns 400 disposed on the central area.

Furthermore, a size, a thickness, or the like of the light conversion pattern 400 disposed on the peripheral area of the backlight unit may be different from a size, a thickness, or the like of the light conversion pattern 400 disposed on the central area of the backlight unit.

For example, as an example illustrated in FIG. 5B, a size S1 of the light conversion patterns 400e, 400f disposed on the peripheral area of the backlight unit may be smaller than a size S2 of the light conversion pattern 400g disposed on the central area of the backlight unit.

Alternatively, the light conversion pattern 400 may be a multi-layer structure above-mentioned, in this case, a thickness or an area of the thickest portion of the light conversion pattern 400e, 400f disposed on the peripheral area of the backlight unit may be smaller than a thickness or an area of the thickest portion of the light conversion pattern 400g disposed on the central area of the backlight unit.

That is, by being a size of the light conversion patterns 400e, 400f disposed on the peripheral area of the backlight unit small, the light conversion patterns 400e, 400f may be disposed to be corresponded to the light sources 240 disposed as short distances. Thus, it may be prevented that the hot spot occurs in a portion corresponding to the light source 240 in the peripheral area of the backlight unit.

And by lowering a level blocking a light emitted from the light source 240 in the peripheral area of the backlight unit, an amount of a light being output may be increased, a luminance decrease of the peripheral area of the backlight unit may be prevented, and a uniform luminance may be represented in overall area of the backlight unit.

In this way, by disposing a structure of the light conversion pattern 400 differently for each area of the backlight unit, a luminance uniformity may be improved while preventing that a luminance is reduced in the peripheral area of the backlight unit. And the hot spot of the backlight unit may be prevented and a luminance uniformity may be improved by a structure that the light conversion pattern 400 is disposed as above-mentioned.

Furthermore, according to various embodiments of the disclosure, by disposing a filter reflecting a light of a certain wavelength band on and under the color conversion sheet 600, a method improving a color reproduction range of the backlight unit is provided. Especially, by disposing the light conversion pattern 400 at a filter positioned under the color conversion sheet 600, the backlight unit improving the color reproduction range and the image quality may be implemented easily.

FIG. 6 is a view illustrating other example of a structure of the backlight unit according to various embodiments of the disclosure.

Referring to FIG. 6, the light source 240 may be disposed on the printed circuit 230, and the reflection plate 260 may be disposed on an area where the light source 240 is not disposed on the printed circuit 230. The light source 240 may be disposed inside the hole included in the reflection plate 260, and may emit a blue light.

The light source protection portion 270 is disposed on the light source 240 and the reflection plate 260.

A first reflection filter 810 reflecting a light of a certain wavelength band may be disposed on the light source protection portion 270. The first reflection filter 810 may be a structure that materials having a different refractive index (e.g., TiO, SiO, or the like) are stacked as multiple layers.

And the plurality of light conversion patterns 400 positioned to be corresponded to the light source 240 may be disposed on at least one surface of a top surface and a bottom surface of the first reflection filter 810.

The first reflection filter 810 may reflect at least a part of a light of a wavelength band other than a wavelength band of a light which the light source 240 emits. For example, in a case that the light source 240 emits a blue light, the first reflection filter 810 may transmit the blue light and may reflect at least a part of a green light and a red light.

That is, as an example of a transmission spectrum of the first reflection filter 810 illustrated in FIG. 6, the first reflection filter 810 may transmit the blue light by making that a transmittance to the blue light is close to 100%, and the first reflection filter 810 may block the green light and the red light by making that transmittances to the green light and the red light are close to 0%.

Accordingly, the first reflection filter 810 makes the blue light emitted from the light source 240 to be supplied to the color conversion sheet 600 positioned on the first reflection filter 810 without the blue light is blocked. And in a case that a part of the green light or the red light excited in the color conversion sheet 600 is scattered to lower part, the first reflection filter 810 makes scattered lights to be supplied to the display panel 110 by being reflected by the first reflection filter 810.

Furthermore, it may be prevented that the hot spot occurs on an area where the light source 240 is disposed by the light conversion pattern 400 disposed on a top surface or a bottom surface of the first reflection filter 810, and the image quality may be improved.

That is, by disposing the first reflection filter 810, of which the light conversion pattern 400 is disposed on one surface, between the light source protection portion 270 and the color conversion sheet 600, the image quality and the light efficiency of the backlight unit may be improved.

And a second reflection filter 820 reflecting a light of a certain wavelength band may be disposed on the color conversion sheet 600. The second reflection filter 820 may be a structure that materials having a different refractive index (e.g., TiO, SiO, or the like) are stacked as multiple layers.

The second reflection filter 820 may be disposed to be contact with the color conversion sheet 600 directly. Alternatively, a transparent film or an air layer which don't affect a scattering of a light may be disposed between the second reflection filter 820 and the color conversion sheet 600.

The second reflection filter 820 may reflect a light of a part wavelength band of a wavelength band of a light reflected by the first reflection filter 810.

In a case that the first reflection filter 810 reflects a green light and a red light, the second reflection filter 820 may reflect a light of a part wavelength band of the green light. And a wavelength band of a light reflected by the second reflection filter 820 among the green light may be positioned between a peak wavelength of the green light and a peak wavelength of the red light.

That is, as an example of a transmission spectrum of the second reflection filter 820 illustrated in FIG. 6, by making that a transmittance of the second reflection filter 820 to a light of a part wavelength band among the green light is close to 0%, a light of above wavelength band may be blocked. And a transmittance of the second reflection filter 820 to a light of remaining wavelength band may be close to 100%.

For example, the second reflection filter 820 may reflect a light included in a range of 540-590 nm. Alternatively, the second reflection filter 820 may be designed to reflect a light of 550-570 nm. By blocking a light of a long wavelength of the green light by the second reflection filter 820, a green color of a wavelength band which is desired (Narrow Green) may be implemented. And the second reflection filter 820 transmits a light except for a green light of a long wavelength so that a light of remaining wavelength band may be supplied to the display panel 110.

A light of a part wavelength band of the green light excited by the color conversion sheet 600 may be reflected by the second reflection filter 820 and may be reached to the first reflection filter 810 positioned under the color conversion sheet 600.

AS the first reflection filter 810 reflects the green light, the green light of a long wavelength reflected by the second reflection filter 820 and reached to the first reflection filter 810 may be reflected by the first reflection filter 810 again. And the green light of a long wavelength reflected by the first reflection filter 810 again may be excited as a red light in the color conversion sheet 600 and may be output onto the backlight unit.

Accordingly, the green light of a desired wavelength band may be implemented by the second reflection filter 820 and the color reproduction range may be enhanced. And by being excited the green light of a long wavelength blocked by the second reflection filter 820 as the red light and being output, the light efficiency of the backlight unit may be increased.

FIGS. 7 and 8 are views illustrating an example of an improvement effect of the color reproduction range by the backlight unit illustrated in FIG. 6.

Referring to FIG. 7, when a wavelength of the blue light which the light source 240 emits is converted by the color conversion sheet 600, as an example illustrated in FIG. 7, a light having a spectrum of a white light may be output onto the color conversion sheet 600.

And the green light of a long wavelength of a light being output onto the color conversion sheet 600 may be blocked by the second reflection filter 820. The green light of a long wavelength blocked by the second reflection filter 820 may be reflected again by the first reflection filter 810. And the green light of a long wavelength reflected again may be excited as the red light in the color conversion sheet 600 and may be output onto the second reflection filter 820.

Referring to FIG. 8, when the first reflection filter 810 and the second reflection filter 820 are disposed as in Case B, compared to a case that the first reflection filter 810 and the second reflection filter 820 are not disposed as in Case A, it can be seen that a gamut of the green light reproduced is enlarged.

Thus, according to various embodiments of the disclosure, a gamut of the green light may be enlarged while implementing the green light desired, and the light efficiency of the backlight unit may be improved.

Furthermore, by disposing a sheet controlling a path of a light between the color conversion sheet 600 and the second reflection filter 820 additionally, a function blocking the green light of a long wavelength by the second reflection filter 820 may be improved more.

FIGS. 9, 10, 11, 12 and 13 are views illustrating still other examples of structures of the backlight unit according to various embodiments of the disclosure. Below, referring to FIGS. 9 to 13, other examples of the backlight unit according to various embodiments of the disclosure are described, and overlapped portions with described explanation referring to FIG. 6 may be omitted.

Figure 9:
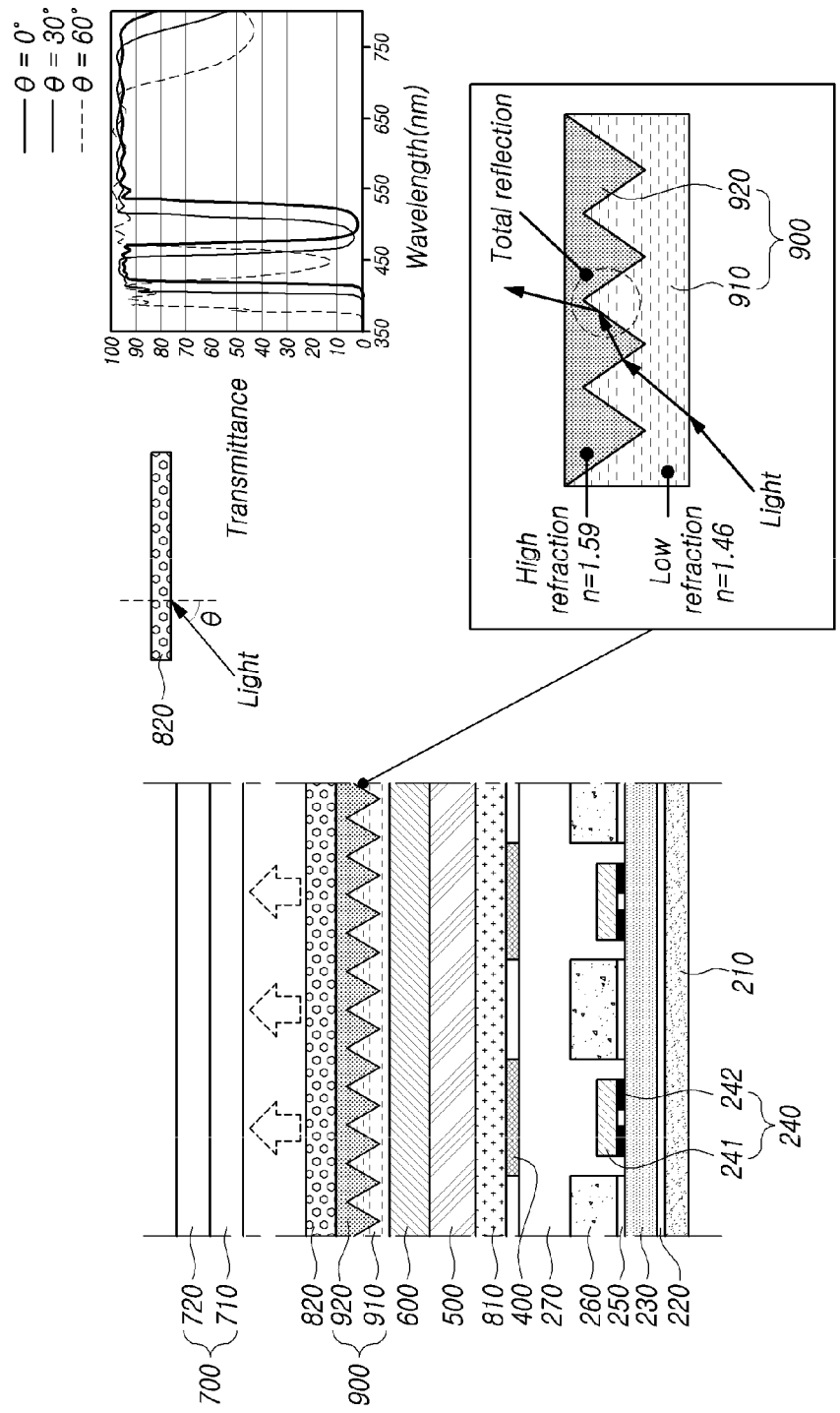
FIGS. 9, 10, 11, 12 and 13 are views illustrating still other examples of structures of the backlight unit according to various embodiments of the disclosure.

Referring to FIG. 9, the first reflection filter 810 may be disposed between the light source protection portion 270 and the color conversion sheet 600. The first reflection filter 810 may transmit the blue light, and may reflect the green light and the red light. Thus, the first reflection filter 810 may transmit the blue light emitted from the light source 240, and may reflect the green light and the red light excited in the color conversion sheet 600 and scattered toward the first reflection filter 810.

And the light conversion pattern 400 may be disposed on at least one surface of the first reflection filter 810. The light conversion pattern 400 may be disposed to be corresponded to the light source 240, and may reflect, scatter, diffract or transmit a light emitted from the light source 240. Thus, the image quality may be improved while preventing the hot spot of the backlight unit.

Here, the diffusion plate 500 may be disposed between the first reflection filter 810 and the color conversion sheet 600. Thus, an efficiency that a light transmitting the first reflection filter 810 or reflected by the first reflection filter 810 is supplied to the color conversion sheet 600 may be improved.

The second reflection filter 820 may be disposed on the color conversion sheet 600. The second reflection filter 820 may reflect a light of a part wavelength band of the green light. And the second reflection filter 820 may transmit a light of remaining wavelength band. For example, the second reflection filter 820 may reflect the green light of a long wavelength to implement the green light of a desired wavelength band.

And the green light of a long wavelength reflected by the second reflection filter 820 may be reflected by the first reflection filter 810 again, excited as the red light by the color conversion sheet 600, and output onto the second reflection filter 820. Thus, the light efficiency may be improved.

Here, a light path control sheet 900 may be disposed under the second reflection filter 820 for reflecting the green light of a long wavelength to be reflected by the second reflection filter 820 accurately.

Referring to a transmission spectrum of the second reflection filter 820 according to an incident angle θ to the second reflection filter 820 illustrated in FIG. 9, in a case that the incident angle θ is 0°, a desired green light of a long wavelength may be reflected by the second reflection filter 820. But it can be seen that a wavelength band blocked by the second reflection filter 820 moves to a short wavelength as the incident angle θ becomes 30°, 60°. That is, as the incident angle of a light being entered to the second reflection filter 820 become large, the second reflection filter 820 may not block a light of a desired wavelength band.

Thus, according to various embodiments of the disclosure, the light path control sheet 900 controlling a path of a light is disposed under the second reflection filter 820 so that a vertical light or a light that the incident angle θ is close to 0° is increased. And by controlling the incident angle of a light being entered to the second reflection filter 820, the second reflection filter 820 may reflect the green light of a desired wavelength band.

For example, the light path control sheet 900 may comprise a first layer 910 positioned adjacent to the color conversion sheet 600, and a second layer 920 positioned adjacent to the second reflection filter 820.

The first layer 910 may have a first refractive index (e.g., 1.46) and may be a protruded shape toward the second reflection filter 820 like as a triangular pyramid or a prism or the like. The second layer 920 may have a second refractive index (e.g., 1.59) greater than the first refractive index and may be a protruded shape toward the color conversion sheet 600. And the first layer 910 and the second layer 920 may be disposed as a structure meshed each other.

As the first layer 910 and the second layer 920 have different refractive indexes each other and contact surfaces of the first layer 910 and the second layer 920 form inclined surface, a light transmitting the first layer 910 may be totally reflected at the interface between the first layer 910 and the second layer 920. Thus, a light being entered to the first layer 910 as a large incident angle may pass through the first layer 910 and the second layer 920 to be entered to the second reflection filter 820 as a state that the incident angle thereof is reduced.

In this way, by disposing the light path control sheet 900 controlling the incident angle of a light being entered to the second reflection filter 820 under the second reflection filter 820, a vertical light being entered to the second reflection filter 820 may be increased. Thus, a light of a wavelength band to be desired to be reflected by the second reflection filter 820 may be reflected, the color reproduction range and the light efficiency may be improved.

Here, the light path control sheet 900 and the second reflection filter 820 may be disposed to be contact directly each other. That is, other members may not be disposed between the light path control sheet 900 and the second reflection filter 820.

Alternatively, in some cases, a transparent film or an air layer which don't scatter a light output by the light path control sheet 900 may be disposed between the light path control sheet 900 and the second reflection filter 820.

As not disposing a structure that scatters a light between the light path control sheet 900 and the second reflection filter 820, an angle that a light output by the light path control sheet 900 is entered to the second reflection filter 820 may be maintained.

Alternatively, by disposing a pattern controlling a path of a light on a bottom surface of the second reflection filter 820 directly, the incident angle of a light being entered to the second reflection filter 820 may be controlled.

Figure 10:
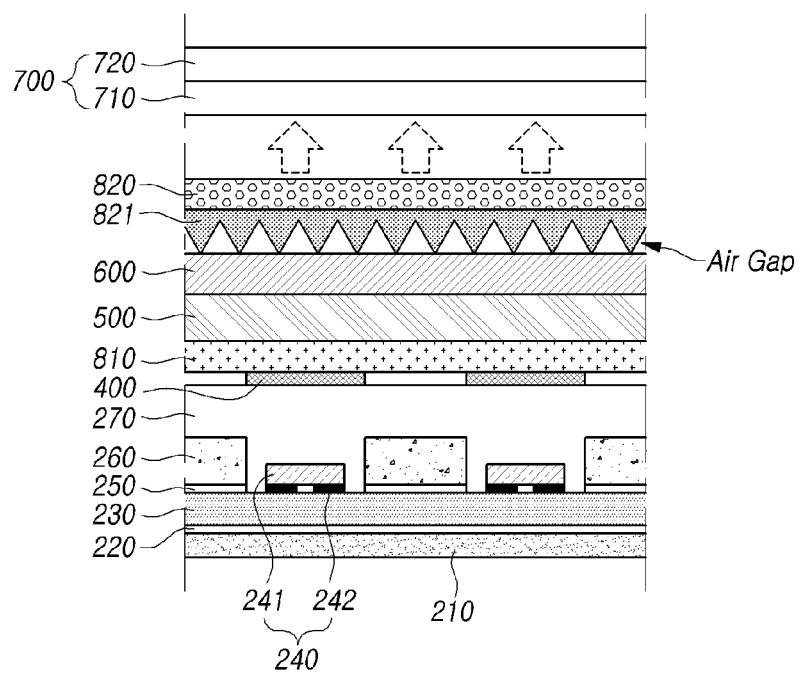

Referring to FIG. 10, the first reflection filter 810 comprising the light conversion pattern 400 may be disposed under the color conversion sheet 600. And the second reflection filter 820 may be disposed on the color conversion sheet 600.

A light path control pattern 821 comprising a inclined surface and having a refractive index greater than that of an air may be disposed on a bottom surface of the second reflection filter 820. And an air gap may be present between the light path control pattern 821 of the second reflection filter 820 and the color conversion sheet 600.

Thus, the air gap being present between the color conversion sheet 600 and the light path control pattern 821 may provide a function like the first layer 910 of the light path control sheet 900. And the light path control pattern 821 may provide a function like the second layer 920 of the light path control sheet 900.

In this way, by disposing the light path control pattern 821 under the second reflection filter 820, an angle that a light being output through the color conversion sheet 600 is entered to the second reflection filter 820 may be controlled without adding separate sheets.

That is, in embodiments illustrated in FIG. 10, the light conversion pattern 400 may be disposed on at least one surface of the first reflection filer 810, and the light path control pattern 821 may be disposed on a bottom surface of the second reflection filter 820. The light conversion pattern 400 may reflect at least a part of a light downwardly the first reflection filter 810 and may prevent the hot spot. And the light path control pattern 821 may reflect a light toward the second reflection filter 820 upwardly and may increase a vertical light being entered to the second reflection filter 820.

Thus, according to various embodiments of the disclosure, in a structure that filters reflecting a light of certain wavelength bands are disposed on and under the color conversion sheet 600, by disposing optical patterns having different usages at each filter, the backlight unit which an optical characteristic is improved may be implemented easily while minimizing an addition of sheets.

Furthermore, the first reflection filter 810 positioned under the color conversion sheet 600 may be disposed as various structures according to a structure of the light source protection portion 270 or the like positioned under the first reflection filter 810.

Figure 11:
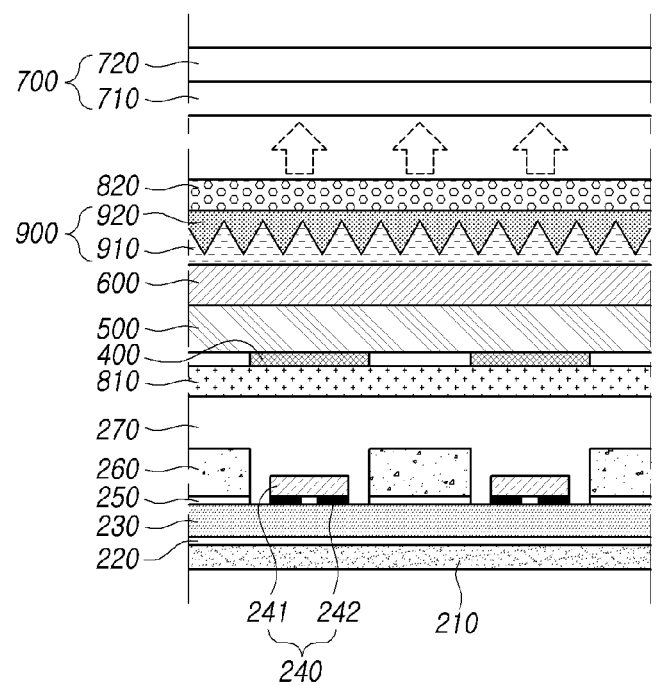

Referring to FIG. 11, the light conversion pattern 400 disposed on at least one surface of the first reflection filter 810 may disposed on a top surface of the first reflection filter 810. And the diffusion plate 500, the color conversion sheet 600, the light path control sheet 900 and the second reflection filter 820 may be disposed on the light conversion pattern 400 sequentially.

As the first reflection filter 810 transmits the blue light, the blue light emitted from the light source 240 may transmit the first reflection filter 810. And when a light transmitting the first reflection filter 810 is reached to the light conversion pattern 400, the light may be scattered, reflected or diffracted.

Furthermore, the green light or the red light scattered toward the first reflection filter 810 in the color conversion sheet 600, or the green light of a long wavelength reflected by the second reflection filter 820 may be reflected at the first reflection filter 810 or the light conversion pattern 400 and may be provided to the color conversion sheet 600.

That is, in a structure that the light conversion pattern 400 is disposed on a top surface of the first reflection filter 810, functions of the light conversion pattern 400 and the first reflection filter 810 may be provided at it is.

Alternatively, in some cases, for reducing a thickness of the backlight unit more, the first reflection filter 810 may be disposed as a structure that the first reflection filter 810 seals the light source protection portion 270 disposed on the light source 240.

Figure 12:
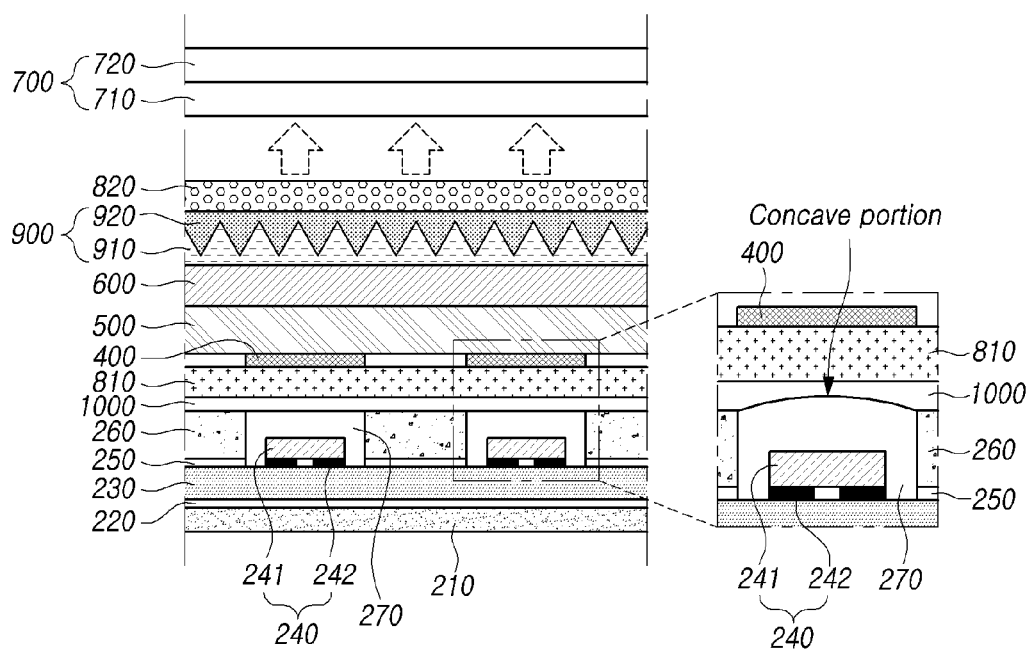

Referring to FIG. 12, the light source 240 may be disposed on the printed circuit 230, and the reflection plate 260 may be disposed on an area where the light source 240 is not disposed on the printed circuit 230. That is, the light source 240 may be disposed inside the hole of the reflection plate 260.

The light source protection portion 270 disposed as encompassing the light source 240 may be disposed inside the hole of the reflection plate 260, and the light source protection portion 270 disposed in adjacent holes may be disposed as a spaced structure each other.

A coating layer 1000 may be disposed on the light source protection portion 270 and the reflection plate 260. The coating layer 1000, for example, may be a silicone-based adhesive material. Thus, the coating layer 1000 may provide a function to adhere an optical member disposed on the coating layer 1000, and also may provide a function to guide a light output through the light source protection portion 270.

The first reflection filter 810 may be disposed on the coating layer 1000. And the light conversion pattern 400 may be disposed on a top surface of the first reflection filter 810.

Since the light conversion pattern 400 is disposed on a top surface of the first reflection filter 810, the first reflection filter 810 may be disposed on the coating layer 1000 easily. And as the coating layer 1000 is disposed on the reflection plate 260 directly, the backlight unit which the color reproduction range and the light efficiency are improved may be provided while reducing a thickness of the backlight unit.

Here, a top surface of the light source protection portion 270 may be flat, or as an example illustrated in FIG. 12, may be a convex shape. Thus, a bottom surface of the coating layer 1000 corresponding to the light source protection portion 270 may comprise a concave portion.

Since a light which the light source 240 emits have to be output outside of the light source protection portion 270, it is required that an air layer is not present between the light source protection portion 270 and the coating layer 1000. Thus, by implementing a top surface of the light source protection portion 270 as a convex shape, the air layer may not be present between the light source protection portion 270 and the coating layer 1000.

Furthermore, by making a top surface of the light source protection portion 270 to have a convex shape, a light extraction efficiency by the light source protection portion 270 may be increased.

In this way, by positioning the first reflection filter 810 comprising the light conversion pattern 400 on the light source protection portion 270 and the reflection plate 260 by the coating layer 1000, the backlight unit which the color reproduction range and the light efficiency are improved may be provided while reducing an overall thickness.

Alternatively, for enhancing a light guide function of a light emitted from the light source 240, a layer for light guide may be added on the coating layer 1000, and the first reflection filter 810 may be disposed separately.

Figure 13:
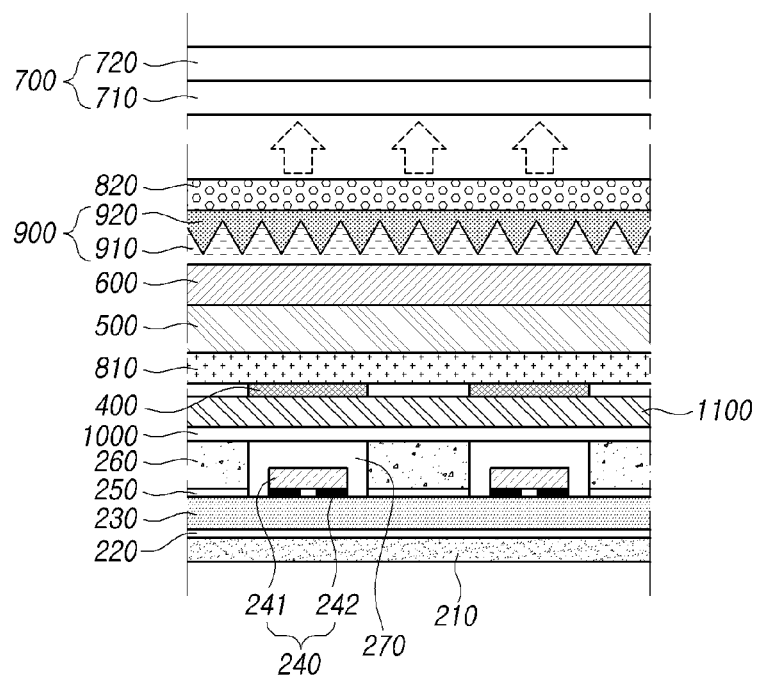

Referring to FIG. 13, the light source protection portion 270 may be disposed inside the hole of the reflection plate 260, and the light source protection portion 270 disposed in adjacent holes may be disposed as a spaced structure each other. And the coating layer 1000 may be disposed on the light source protection portion 270 and the reflection plate 260. Here, a top surface of the light source protection portion 270, as an example illustrated in FIG. 12, may be a convex shape.

A light guide film 1100 may be disposed on the coating layer 1000. The light guide film 1100, for example, may be made of PC or PET. And the light conversion pattern 400 may be disposed on the light guide film 1100.

As described above, as the coating layer 1000 may provide a light guide function, the coating layer 1000 and the light guide film 1100 may guide a light emitted from the light source 240 and may make the light to be spread onto the light guide film 1100. And by converting a path of a light output in a close direction to a vertical direction of the light source 240 by the light conversion pattern 400 disposed on the light guide film 1100, the hot spot may be prevented.

The first reflection filter 810 may be disposed on the light conversion pattern 400, and the first reflection filter 810 may improve the color reproduction range and the light efficiency together with the second reflection filter 820.

Furthermore, in some cases, the light conversion pattern 400 may be disposed on a bottom surface of the first reflection filter 810 in a case that the light guide film 1100 is disposed, but by disposing the light conversion pattern 400 on a top surface of the light guide film 1100, it may make easy a disposition of the light guide film 1100 and the first reflection filter 810 or the like on the light source 240.

According to various embodiments of the disclosure above-mentioned, by disposing the second reflection filter 820 which reflects a green light of a long wavelength of a green light on the color conversion sheet 600 and disposing the first reflection filter 810 which reflects a green light and a red light under the color conversion sheet 600, the light efficiency may be increased while increasing the color reproduction range by implementing a desired green light.

Furthermore, by increasing a vertical light being entered to the second reflection filter 820 by disposing a sheet or a pattern controlling a path of a light under the second reflection filter 820, a light which is required to be blocked by the second reflection filter 820 may be blocked accurately.

Furthermore, by disposing the light conversion pattern 400 converting a path of a light emitted from the light source 240 on one surface of the first reflection filter 810, a method being capable of implementing easily the backlight unit improving the image quality may be provided.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A backlight unit, comprising:
a plurality of light sources;
at least one light source protection portion disposed on the plurality of light sources;
a first reflection filter positioned on the light source protection portion, the first reflection filter reflecting at least a part of a light included in a first wavelength band without reflecting a light included in a second wavelength band, the light included in the first wavelength band and the light included in the second wavelength band emitted from the plurality of light sources, the first reflection filter having a plurality of light conversion patterns disposed on at least one surface of a top surface or a bottom surface;

a color conversion sheet positioned on the first reflection filter; and
a second reflection filter positioned on the color conversion sheet, the second reflection filter reflecting a part of the light reflected by the first reflection filter,
wherein the part of the light reflected by the first reflection filter is included in a part wavelength band of the first wavelength band, and
wherein a wavelength of some of the light reflected by the first reflection filter is greater than a wavelength of the light reflected by the second reflection filter.

2. The backlight unit of claim 1, wherein the plurality of light sources emits a blue light, the first reflection filter reflects a green light and a red light, and the second reflection filter reflects the green light that is included in the part wavelength band of the first wavelength band.

3. The backlight unit of claim 2, wherein the part wavelength band of the first wavelength band is positioned between a peak wavelength of the green light and a peak wavelength of the red light.

4. The backlight unit of claim 1, further comprising:
a light path control sheet positioned between the color conversion sheet and the second reflection filter,
wherein the light path control sheet includes:
a first layer positioned adjacent to the color conversion sheet, the first layer having a first refractive index; and
a second layer positioned adjacent to the second reflection filter, the second layer including a shape that is meshed with the first layer, and the second layer having a second refractive index that is greater than the first refractive index.

5. The backlight unit of claim 4, wherein at least a part of a top surface of the light path control sheet is in direct contact with at least a part of a bottom surface of the second reflection filter.

6. The backlight unit of claim 4, wherein an air layer is present in at least a part region between a top surface of the light path control sheet and a bottom surface of the second reflection filter.

7. The backlight unit of claim 1, wherein the second reflection filter includes a light path control pattern disposed on a bottom surface of the second reflection filter, the second reflection filter including an inclined surface, the second reflection filter having a refractive index greater than a refractive index of an air.

8. The backlight unit of claim 1, further comprising:
a reflection plate disposed on at least a part of an area, the reflection plate non-overlapping with the plurality of light sources.

9. The backlight unit of claim 8, wherein the reflection plate includes a plurality of holes, the reflection plate positioned in the area on where the light sources are disposed, the light source protection portion is disposed as a shape being filled in each of the plurality of holes, and the light source protection portions disposed in adjacent holes are separated from each other.

10. The backlight unit of claim 9, wherein the light conversion pattern is disposed on the top surface of the first reflection filter, and the first reflection filter is disposed on the light source protection portion and the reflection plate.

11. The backlight unit of claim 9, wherein a top surface of the light source protection portion is a convex shape.

12. The backlight unit of claim 1, wherein each of the plurality of light conversion patterns is positioned to be corresponded with a respective light source of the plurality of light sources, and the plurality of light conversion patterns is configured to change a path of at least a part of the light emitted from the plurality of light sources.

13. The backlight unit of claim 1, further comprising:
a diffusion plate disposed between the first reflection filter and the color conversion sheet.

14. The backlight unit of claim 7, wherein the light conversion pattern reflects at least a part of a light reached to the light conversion pattern to downside of the light conversion pattern, and the light path control pattern reflects at least a part of a light reached to the light path control pattern to upside of the light path control pattern.

15. A display device, comprising:
a display panel including a plurality of subpixels and displaying an image; and
a backlight unit according to claim 1, and wherein the backlight unit is disposed on a side opposite to a side on which the display panel displays the image.

16. A display device, comprising:
a display panel including a plurality of subpixels and displaying an image; and
a backlight unit according to claim 4, and wherein the backlight unit is disposed on a side opposite to a side on which the display panel displays the image.

17. A backlight unit, comprising:
a plurality of light sources;
at least one light source protection portion disposed on the plurality of light sources;
a first reflection filter positioned on the light source protection portion, the first reflection filter reflecting at least a part of a light included in a first wavelength band without reflecting a light emitted from the plurality of light sources, the first reflection filter having a plurality of light conversion patterns disposed on at least one surface of a top surface or a bottom surface;
a color conversion sheet positioned on the first reflection filter;
a diffusion plate disposed between the first reflection filter and the color conversion sheet; and
a second reflection filter positioned on the color conversion sheet, the second reflection filter reflecting a part of the light reflected by the first reflection filter,
wherein the part of the light reflected by the first reflection filter is included in a part wavelength band of the first wavelength band.

18. A backlight unit, comprising:
a plurality of light sources;
at least one light source protection portion disposed on the plurality of light sources;
a first reflection filter positioned on the light source protection portion, the first reflection filter reflecting at least a part of a light included in a first wavelength band without reflecting a light emitted from the plurality of light sources, the first reflection filter having a plurality of light conversion patterns disposed on at least one surface of a top surface or a bottom surface;
a color conversion sheet positioned on the first reflection filter;
a reflection plate disposed on at least a part of an area, the reflection plate non-overlapping with the plurality of light sources; and
a second reflection filter positioned on the color conversion sheet, the second reflection filter reflecting a part of the light reflected by the first reflection filter,
wherein the part of the light reflected by the first reflection filter is included in a part wavelength band of the first wavelength band.

19. A backlight unit, comprising:
- a plurality of light sources;
- at least one light source protection portion disposed on the plurality of light sources; and
- a first reflection filter positioned on the light source protection portion, the first reflection filter reflecting at least a part of a light included in a first wavelength band without reflecting a light emitted from the plurality of light sources, the first reflection filter having a plurality of light conversion patterns disposed on at least one surface of a top surface or a bottom surface;
- a color conversion sheet positioned on the first reflection filter; and
- a second reflection filter positioned on the color conversion sheet, the second reflection filter reflecting a part of the light reflected by the first reflection filter,
- wherein the part of the light reflected by the first reflection filter is included in a part wavelength band of the first wavelength band;
- wherein the plurality of light sources emits a blue light, the first reflection filter reflects a green light and a red light, and the second reflection filter reflects the green light that is included in the part wavelength band of the first wavelength band; and
- wherein the part wavelength band of the first wavelength band is positioned between a peak wavelength of the green light and a peak wavelength of the red light.

* * * * *